United States Patent
Jones et al.

(10) Patent No.: US 11,486,682 B2
(45) Date of Patent: Nov. 1, 2022

(54) INTEGRATED PROPULSION AND WARHEAD SYSTEM FOR AN ARTILLERY ROUND

(71) Applicant: Raytheon Company, Waltham, MA (US)

(72) Inventors: Jaylan Jones, Tucson, AZ (US); Donald Messitt, Folsom, CA (US); Brian Hodge, Tucson, AZ (US); Gabe Harris, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 36 days.

(21) Appl. No.: 17/080,097

(22) Filed: Oct. 26, 2020

(65) Prior Publication Data
US 2022/0128341 A1    Apr. 28, 2022

(51) Int. Cl.
*F42B 10/40* (2006.01)
*F02K 7/18* (2006.01)
*F42B 12/20* (2006.01)

(52) U.S. Cl.
CPC ............... *F42B 10/40* (2013.01); *F02K 7/18* (2013.01); *F42B 12/207* (2013.01)

(58) Field of Classification Search
CPC ........ F42B 12/207; F42B 12/20; F42B 10/40; F42B 15/10; F02K 7/18
USPC .................................................. 102/490, 477
See application file for complete search history.

(56) References Cited

U.S. PATENT DOCUMENTS

| | | | | | |
|---|---|---|---|---|---|
| 4,552,071 A | * | 11/1985 | Horais | ..................... | F42B 14/02 244/3.28 |
| 4,729,317 A | * | 3/1988 | Burdette | ................. | F02K 7/105 102/292 |
| 5,067,406 A | * | 11/1991 | Olson | ..................... | F42B 10/34 102/374 |
| 7,051,659 B2 | * | 5/2006 | Tyll | ........................ | F42B 15/00 60/768 |
| 2013/0255527 A1 | * | 10/2013 | Levy | ....................... | F42B 15/01 102/517 |

FOREIGN PATENT DOCUMENTS

| | | | | |
|---|---|---|---|---|
| CH | 320359 A | | 3/1957 | |
| FR | 320359 A | * | 12/1954 | |
| GB | 2165338 | | 4/1986 | |
| GB | 2165338 A | * | 4/1986 | ............... F02K 7/18 |

(Continued)

OTHER PUBLICATIONS

International Search Report and Written Opinion dated Nov. 22, 2021 in corresponding International Application No. PCT/US2021/017417.

*Primary Examiner* — John Cooper
(74) *Attorney, Agent, or Firm* — Renner, Otto, Boisselle & Sklar, LLP

(57) ABSTRACT

An integrated propulsion and warhead system for an artillery round includes a propulsion, such as a solid rocket motor and/or an air-breathing jet engine, and an annular explosive concentrically arranged around at least a portion of the propulsion system. The integrated propulsion and warhead system is included in a propulsion section of the artillery round so that space in an adjacent guidance section is increased and the space allocation for the propulsion system and annular explosive is optimized.

18 Claims, 5 Drawing Sheets

(56) References Cited

FOREIGN PATENT DOCUMENTS

| RU | 2674407 C1 | 12/2018 | |
|---|---|---|---|
| WO | 2008/123868 | 10/2008 | |
| WO | WO-2008123868 A2 * | 10/2008 | ............... F02K 7/10 |
| WO | 2010/083517 | 7/2010 | |
| WO | WO-2010083517 A * | 7/2010 | .............. F42B 10/64 |
| WO | WO-2010083517 A1 * | 7/2010 | .............. F42B 10/64 |
| WO | 2019211716 A1 | 11/2019 | |

* cited by examiner

INTEGRATED PROPULSION AND WARHEAD SYSTEM FOR AN ARTILLERY ROUND

GOVERNMENT LICENSE RIGHTS

This invention was made with Government support under contract number W15QKN-14-9-1001, awarded by the United States of America Department of Defense. The Government has certain rights in the invention.

TECHNICAL FIELD

The present invention relates generally to gun-launched projectiles and more particularly to extended-range artillery munitions.

BACKGROUND

In the development of extended range artillery munitions, balancing the available space for various guidance and control elements and a conventional cylindrical fragmenting warhead in the guidance section, with the necessary space for an optimal propulsion system in the propulsion section, leads to significant space shortages within the artillery round. The limitations on space shared by the propulsion system, the guidance and control elements, and the warhead make it difficult to use standard space allocations in the artillery round. Prior solutions have included shortening the propulsion section and propulsion system to allocate more space for the cylindrical fragmenting warhead, or otherwise reducing the length of the cylindrical fragmenting warhead in the guidance section to create more space for the guidance and control hardware and electronics. Both of these prior solutions, however, lead to inadequate performance of the propulsion system while limiting warhead size and effectiveness.

SUMMARY

In a general embodiment, a propulsion system and an explosive are integrated into a propulsion section of an artillery round as an integrated propulsion and warhead system. The integrated propulsion and warhead system includes a propulsion system, such as a solid rocket motor and/or an air-breathing jet engine, and an explosive configured as an annular explosive concentrically arranged around at least a portion of the propulsion system within the propulsion section. The integration of both the propulsion system and the explosive within the propulsion section frees up space in an adjacent guidance section of the artillery round while permitting maximum space allocation for the propulsion volume in the propulsion section of the artillery round.

According to an aspect of the invention, an integrated propulsion and warhead system for an artillery round is provided. The integrated propulsion and warhead system includes a propulsion system and an annular explosive concentrically arranged around at least a portion of the propulsion system.

According to an embodiment of any paragraph(s) of this summary, the propulsion system includes a solid rocket motor.

According to another embodiment of any paragraph(s) of this summary, the propulsion system includes an air-breathing jet engine.

According to another embodiment of any paragraph(s) of this summary, the propulsion system includes a solid rocket motor and an annular, air-breathing jet engine concentrically arranged around at least a portion of the solid rocket motor.

According to another embodiment of any paragraph(s) of this summary, the air-breathing jet engine includes a ramjet.

According to another embodiment of any paragraph(s) of this summary, the air-breathing jet engine includes a scramjet.

According to another embodiment of any paragraph(s) of this summary, the annular explosive includes a high-explosive material.

According to another embodiment of any paragraph(s) of this summary, the integrated propulsion and warhead system further includes an annular insulating member concentrically arranged between the propulsion system and the annular explosive.

According to another embodiment of any paragraph(s) of this summary, the integrated propulsion and warhead system further includes an annular support member concentrically arranged between the propulsion system and the annular explosive.

According to another embodiment of any paragraph(s) of this summary, the annular support member is concentrically arranged around the annular insulating member.

According to another embodiment of any paragraph(s) of this summary, the integrated propulsion and warhead system further includes a housing concentrically arranged around the annular explosive.

According to another aspect of the invention, an artillery round is provided. The artillery round includes a housing defining a guidance section and a propulsion section. The propulsion section includes an integrated propulsion and warhead system. The integrated propulsion and warhead system includes a propulsion system and an annular explosive concentrically arranged around at least a portion of the propulsion system.

According to an embodiment of any paragraph(s) of this summary, the artillery round includes a nozzle. The guidance section is arranged on a fore end of the propulsion section and the nozzle is arranged on an aft end of the propulsion section.

According to another embodiment of any paragraph(s) of this summary, the housing further defines at least one air inlet for guiding ambient air into the propulsion section.

According to another embodiment of any paragraph(s) of this summary, the artillery round further includes a fuel isolator disposed between the propulsion section and the guidance section.

According to another embodiment of any paragraph(s) of this summary, the artillery round further includes an annular insulating member concentrically arranged between the propulsion system and the annular explosive.

According to another embodiment of any paragraph(s) of this summary, the artillery round further includes an annular support member concentrically arranged around the annular insulating member.

According to another embodiment of any paragraph(s) of this summary, the artillery round further includes a safe and arm device operatively coupled to the annular explosive in propulsion section and configured to control detonation of the annular explosive.

According to another embodiment of any paragraph(s) of this summary, the propulsion system includes a solid rocket motor and an annular, air-breathing jet engine concentrically arranged around the solid rocket motor.

According to another aspect of the invention, a method of assembling an integrated propulsion and warhead system for an artillery round is presented. The method includes the step of forming a housing defining a propulsion section. The method also includes the step of disposing a propulsion system within the propulsion section. The method also includes the step of arranging an annular explosive concentrically around at least a portion of the propulsion system within the propulsion section.

According to another aspect of the invention, a method of detonating an artillery round is provided. The method includes the step of discharging the artillery round from an artillery piece at an initial velocity. The artillery round includes a propulsion system having a solid rocket motor and an annular air-breathing jet engine concentrically arranged around at least a portion of the solid rocket motor. The artillery round also includes an annular explosive concentrically arranged around at least a portion of the propulsion system. The method also includes the step of igniting the solid rocket motor to maintain or increase the initial velocity of the artillery round after discharge from the artillery piece and to propel the artillery round until the solid rocket motor is depleted. The method also includes the step of igniting the air-breathing jet engine after depletion of the solid rocket motor to further propel the artillery round until it reaches a predetermined target. The method also includes the step of detonating the annular explosive when it reaches the predetermined target.

The following description and the annexed drawings set forth in detail certain illustrative embodiments of the invention. These embodiments are indicative, however, of but a few of the various ways in which the principles of the invention may be employed. Other objects, advantages, and novel features of the invention will become apparent from the following detailed description of the invention when considered in conjunction with the drawings.

BRIEF DESCRIPTION OF DRAWINGS

The annexed drawings show various aspects of the invention.

DETAILED DESCRIPTION

According to a general embodiment, an artillery round includes an integrated propulsion and warhead system in a propulsion section of the artillery round. The integrated propulsion and warhead system includes a propulsion system and an annular explosive concentrically arranged around at least a portion of the propulsion system within the propulsion section. The integration of both the propulsion system and the explosive within the propulsion section frees up space in an adjacent guidance section of the artillery round while permitting maximum space allocation for the propulsion system and the annular explosive in the propulsion section of the artillery round.

Figure 1:
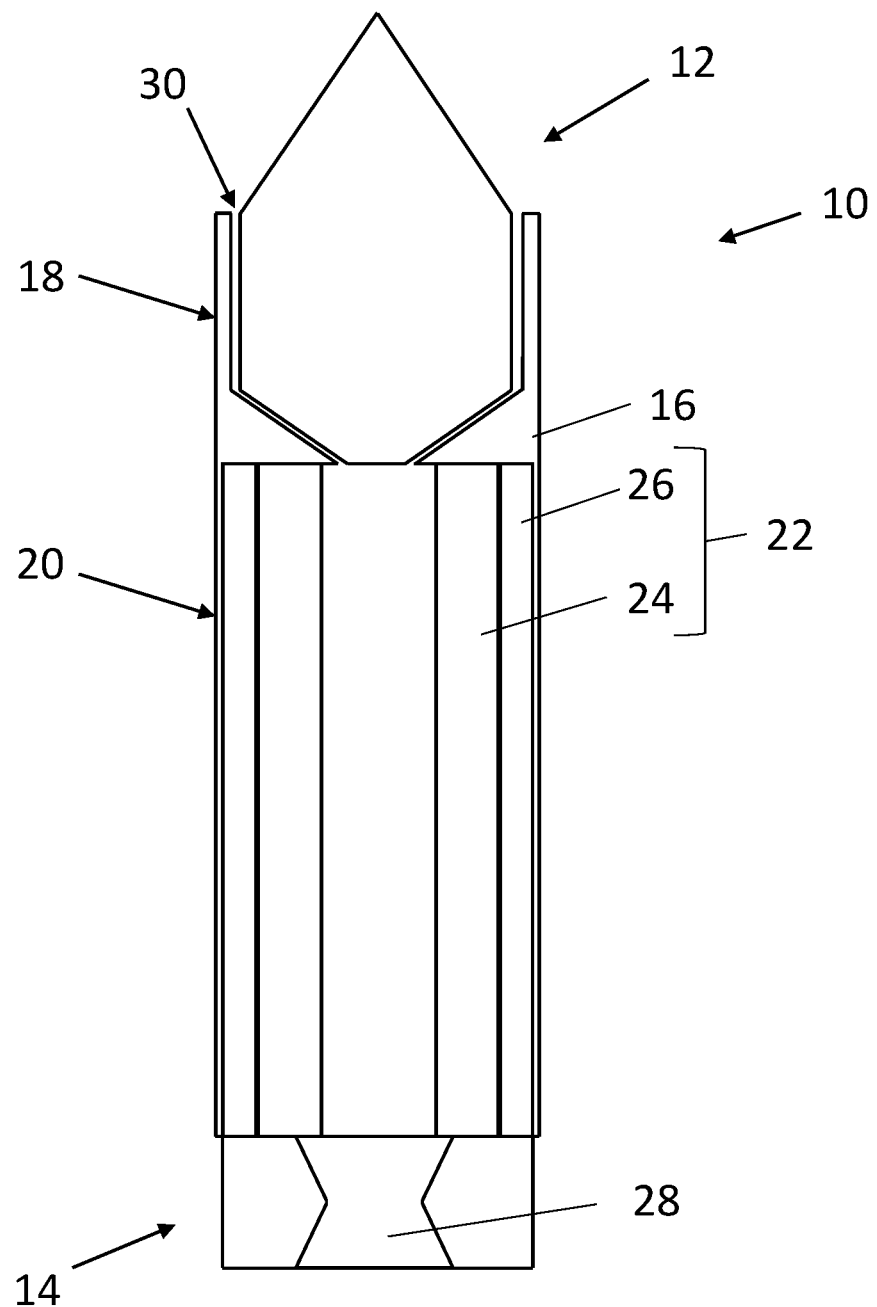
FIG. 1 is a schematic diagram of an artillery round according to an aspect of the invention.

Referring now to the figures, and initially to FIG. 1, an exemplary embodiment is depicted of an artillery round 10 according to an aspect of the invention. The artillery round 10 is configured to be projected or launched from artillery such as, for example, guns, howitzers, mortars and cannons (generally referred to herein as "gun"). The artillery round 10 may be used with other types of artillery, as appropriate.

The artillery round 10, having a fore end 12 and an aft end 14, includes a housing 16 that defines various chambers and parts of the artillery round 10. For example, the housing 10 defines a guidance section 18 in which various hardware and electronics for controlling the artillery round 10 may be housed. Specifically, hardware and electronics such as seeker hardware, navigation sensors, inertial sensors, and processor electronics may be housed in the guidance section 18 of the artillery round 10.

The housing 16 also defines a propulsion section 20 in which an integrated propulsion and warhead system 22 is housed. The guidance section 18 may be located on the fore end 12 of the propulsion section 20. Additionally, a nozzle 28 may be arranged on the aft end 14 of the propulsion section 20. The nozzle 28 may be any suitable type of nozzle for propelling the artillery shell 10.

The integrated propulsion and warhead system 22 includes a propulsion system 24, and an annular explosive 26 concentrically arranged around at least a portion of the propulsion system 24 in the propulsion section 20. For example, the annular explosive 26 may be concentrically arranged around the propulsion system 24 along a portion of or an entire axial length of the propulsion system 24 in the propulsion section 20, and/or even extending past the entire axial length of the propulsion system 24 in the propulsion section 20. As used herein, the term "axial length" refers to a length in the axial (i.e., longitudinal) direction, the axial direction extending between the fore end 12 and the aft end 14 of the artillery round 10.

The annular explosive 26 may be, for example, a fragmenting and/or explosive material and may be made of, for example, a high-explosive material. The high-explosive material may include, for example, RDX or HMX formulations such as PBXN-109, PBXN-110, PBXN-112, PBXN-9. In an embodiment, the annular explosive 26 may not include a fragmentation sleeve to save on space and weight of the annular explosive 26. In this embodiment, the housing 16 may be made of a fragmenting material at least in a portion of the housing 16 that is configured to be concentrically arranged around the annular explosive 26 in the propulsion section 20. The housing 16, therefore, may fragment upon detonation of the annular explosive 26 at a predetermined target. The portion of the housing 16 that is configured to be concentrically arranged around the annular explosive 26 in the propulsion section 20 may have a thickness in the range of 1.27 mm to 50.80 mm (0.05 inches to 2.00 inches), 2.54 mm to 25.40 mm (0.10 inches to 1.00 inches), or 5.08 mm to 17.78 mm (0.20 inches to 0.70 inches). In an embodiment, the portion of the housing 16 that is configured to be concentrically arranged around the annular explosive 26 has a thickness of 7.11 mm (0.28 inches). An optimal thickness of the portion of the housing 16 that is concentrically arranged around the annular explosive 26 will depend on factors such as setback, balloting, and set forward forces imparted on the housing 16 during discharge from the gun, the size of the artillery shell, and desired fragmentation of the housing 16 after detonation of the annular explosive 26.

The annular explosive 26 may have a thickness in the range of 2.54 mm to 38.10 mm (0.10 inches to 1.50 inches), 5.08 mm to 33.02 mm (0.20 inches to 1.30 inches), or 7.62 mm to 25.40 mm (0.30 inches to 1.00 inches). In an embodiment, the annular explosive 26 has a thickness of 9.14 mm (0.36 inches). An optimal thickness of the annular explosive 26 will depend on factors such as critical diameter for detonation, desired fragmentation performance upon detonation, and vulnerability characteristics of the predetermined target to be engaged.

Figure 2:
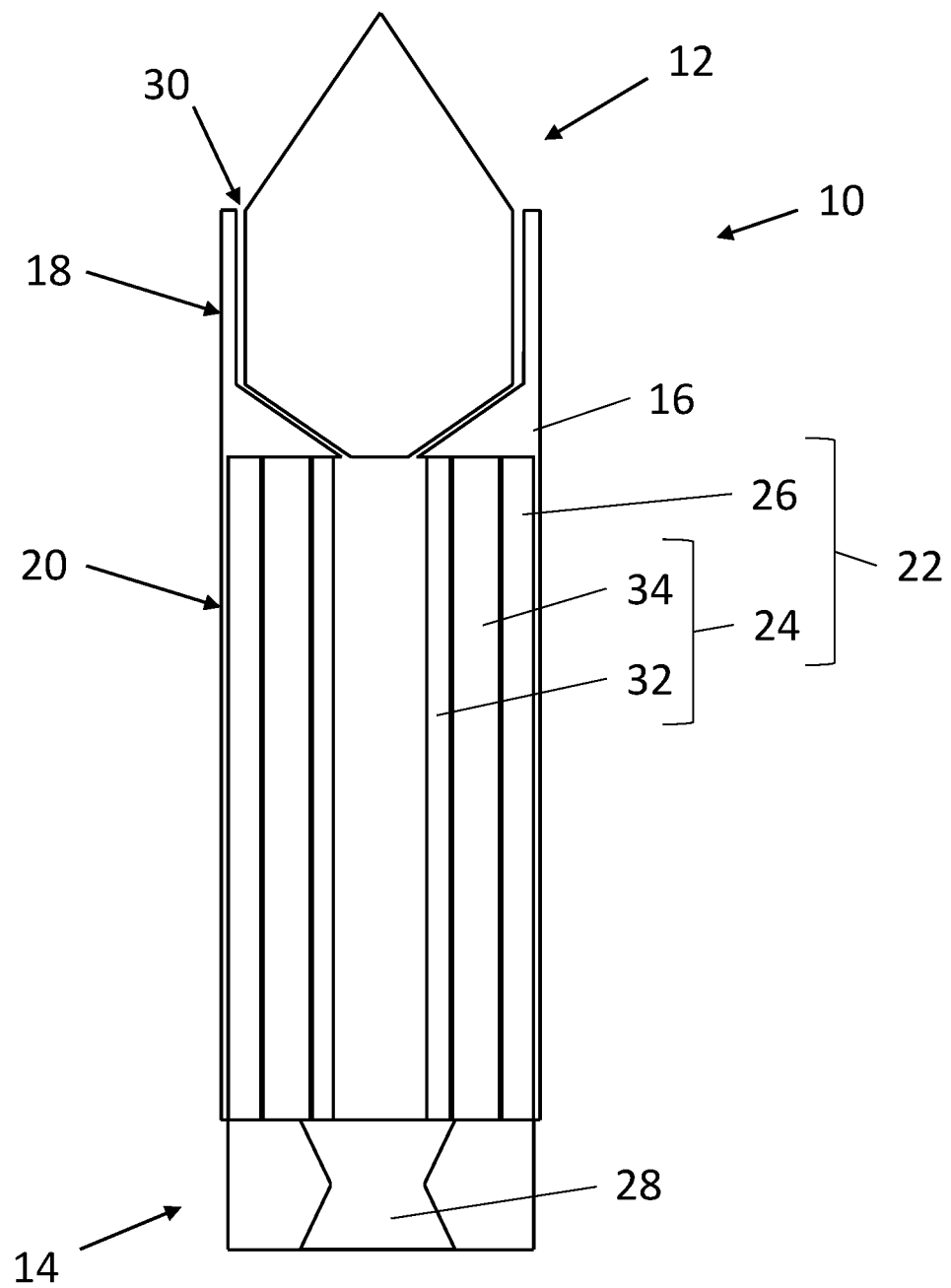
FIG. 2 is a schematic diagram of another embodiment of the artillery round according to an aspect of the invention.

The propulsion system 24, concentrically arranged within the annular explosive 26, is primarily responsible for propelling the artillery round 10 after it has been projected or launched from the gun. The propulsion system 24 may therefore include a solid rocket motor 32 (FIG. 2). The propulsion system 24 may additionally or alternatively include an air-breathing jet engine 34 (FIG. 2). The air-breathing jet engine 34 may include one of, for example, a ramjet and a scramjet. Other types of suitable propulsion systems may be applicable to the artillery round 10. The housing 16 may be configured to define one or more air inlets 30, for example at a fore end 12 of the artillery round 10 for allowing ambient air to enter the artillery round 10 and reach the propulsion section 20 for combustion of the propulsion system 24.

Space allocations within the artillery round 10 can be optimized by integrating the explosive member of the artillery round 10 as the annular explosive 26. Specifically, the explosive member may be included as part of the integrated propulsion and warhead system 22 and may be concentrically arranged around the propulsion system 24 in the propulsion section 20. In this way, allocating space for the explosive member in the guidance section 18 or elsewhere toward the fore end 12 of the artillery round 10, as conventionally done in the development of extended range artillery munition, is not necessary. This preserves space in the guidance section 18 for allocation to various control hardware and electronics, while permitting a maximum length of the propulsion section 20 and, in particular, the propulsion system 24 in the propulsion section 20. This optimizes the extended range at which the propulsion system 24 can propel the artillery round 10 after it has been projected or launched from the gun. Additionally, as the annular explosive 26 may extend up to an entire length of the propulsion section 20, the size and effectiveness of the annular explosive 26 in the artillery round 10 may also be optimized.

FIG. 2 depicts an exemplary embodiment of the artillery shell 10 in which the propulsion system 24 includes both the solid rocket motor 32 and the air-breathing jet engine 34. The air-breathing jet engine 34 is configured to be an annular air-breathing jet engine 34 and is concentrically arranged around at least a portion of the solid rocket motor 32. For example, the air-breathing jet engine 34 may be concentrically arranged around the solid rocket motor 32 along a portion of or the entire axial length of the solid rocket motor 32 in the propulsion section 20, and/or even extending past the entire axial length of the solid rocket motor 32 in the propulsion section 20. In this embodiment, the annular explosive 26 is concentrically arranged around the propulsion system 24, particularly the air-breathing jet engine 34, in the same way as previously described with respect to the embodiment depicted in FIG. 1.

The solid rocket motor 32 may have a thickness in the range of 2.54 mm to 152.4 mm (0.10 inches to 6.00 inches), 5.08 mm to 22.86 mm (0.20 inches to 0.90 inches), 7.62 mm to 20.32 mm (0.30 inches to 0.80 inches), 10.16 mm to 17.78 mm (0.40 inches to 0.70 inches), or 12.70 mm to 15.24 mm (0.50 inches to 0.60 inches). In an embodiment, the solid rocket motor 32 has a thickness of 12.70 mm (0.50 inches). An optimal thickness of the solid rocket motor 32 may depend on factors such as the desired range of the artillery round 10, the minimum temperature at which the round must operate, the gun launch conditions, and the mechanical properties of the rocket propellant.

The ramjet fuel of the air-breathing jet engine 34 may have a thickness in the range of 0.25 mm to 12.70 mm (0.01 inches to 0.50 inches), 1.27 mm to 10.16 mm (0.05 inches to 0.40 inches), or 2.54 mm to 101.6 mm (0.10 inches to 0.40 inches). In an embodiment, the ramjet fuel of the air-breathing jet engine 34 has a thickness of 4.32 mm (0.17 inches). An optimal thickness of the ramjet fuel of the air-breathing jet engine 34 may depend on factors such as the desired range of the artillery round, the level of thrust that the engine needs to produce to overcome drag and deceleration, the minimum temperature at which the round must operate, the gun launch conditions, and the mechanical properties of the fuel.

Figure 3:
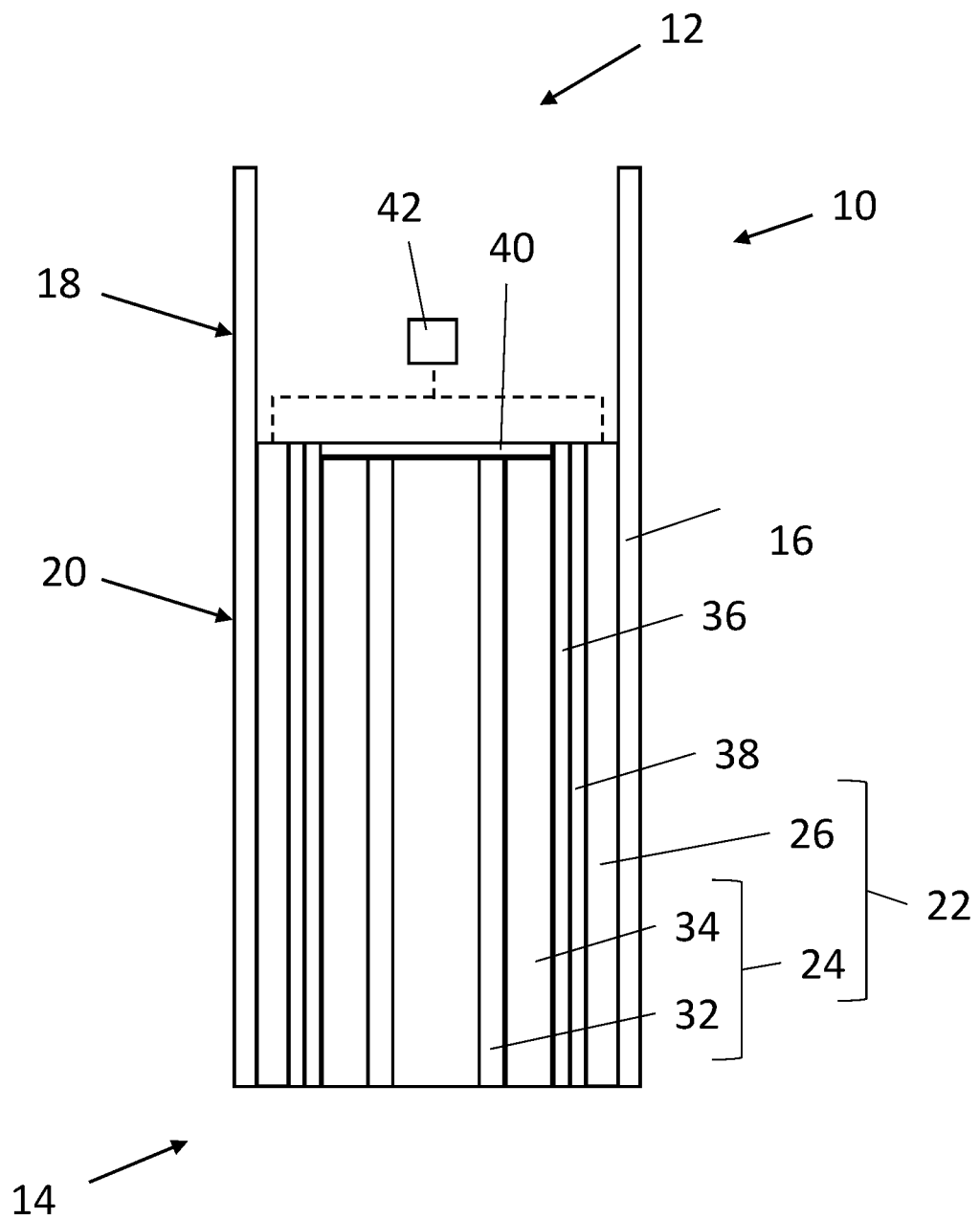
FIG. 3 is a schematic diagram of part of another embodiment of the artillery round according to an aspect of the invention.

FIG. 3 depicts a further exemplary embodiment in which additional features are included in the integrated propulsion and warhead system 22 of to any one of the previously described embodiments. For example, the integrated propulsion and warhead system 22 may additionally include an annular insulating member 36 concentrically arranged between the propulsion system 24 and the annular explosive 26 for insulating the fuel of the propulsion system 24 and the heat that is produced as it combusts, from the annular explosive 26 so that the annular explosive 26 does not detonate prematurely. The annular insulating member 36 may be, for example, EPDM (ethylene propylene diene monomer rubber), DC93-104 or other rocket and ramjet high performance insulator materials. The annular insulating member may have a thickness in the range of 2.54 mm to 15.24 mm (0.10 inches to 0.60 inches), 5.08 mm to 12.7 mm (0.20 inches to 0.50 inches), or 7.62 mm to 10.16 mm (0.30 inches to 0.40 inches). In an embodiment, the annular insulating member has a thickness of 3.30 mm (0.13 inches). An optimal thickness of the annular insulating member will depend on factors such as temperature of the propulsion fuel during flight and heat tolerance of the warhead materials. The annular insulating member is designed to be the minimum thickness required to retard heat transfer sufficient for proper operation of the warhead. The annular insulating member 36 is configured to be concentrically arranged around the propulsion system 24 along an entire axial length of the propulsion system 24 or even extending past an entire axial length of the propulsion system 24.

The integrated propulsion and warhead system 22 may additionally include an annular support member 38 concentrically arranged between the propulsion system 24 and the annular explosive 26 for adding additional structural support to the annular explosive 26 and adding an additional structural layer of separation between the propulsion system 24 and the annular explosive 26. The annular support member 38 may be aluminum, steel, or other metal or non-metal. The annular support member 38 may have a thickness in the range of 1.27 mm to 12.70 mm (0.05 inches to 0.50 inches), 2.54 mm to 10.16 mm (0.10 inches to 0.40 inches), or 5.08 mm to 7.62 mm (0.20 inches to 0.30 inches). In an embodiment, the annular support member 38 has a thickness of 2.54 mm (0.10 inches). An optimal thickness of the annular support member 38 will depend on factors such as forces encountered during gun launch, fragmentation performance considerations, and/or performance trades depending on thicknesses of other concentric components. The annular support member 38 may be, for example, concentrically arranged around the annular insulating member 36 and may extend along an entire axial length of the annular insulating member 36 or even extend past an entire axial length of the annular insulating member 36.

The artillery round 10 may include a fuel isolator 40 disposed between the propulsion section 20 and the guidance section 18 for isolating the components in each chamber from each other. The fuel isolator 40 may be, for example, silica phenolic. The fuel isolator 40 may have a thickness in the range of 0.25 mm to 12.70 mm (0.01 inches to 0.50 inches), 1.27 mm to 10.16 mm (0.05 inches to 0.40 inches), or 2.54 mm to 7.62 mm (0.10 inches to 0.30 inches). In an embodiment, the fuel isolator 40 has a thickness of 5.08 mm (0.20 inches). An optimal thickness of the fuel isolator will be sized to retard heat loss into the guidance section 18, while withstanding gun launch loads. The artillery round 10 may additionally include a safe and arm device 42 in the guidance section 18 operatively coupled to the annular explosive 26 in the propulsion section 20, as depicted by the dotted line FIG. 3. The safe and arm device 42 is configured to control detonation of the annular explosive 26.

Figure 4:
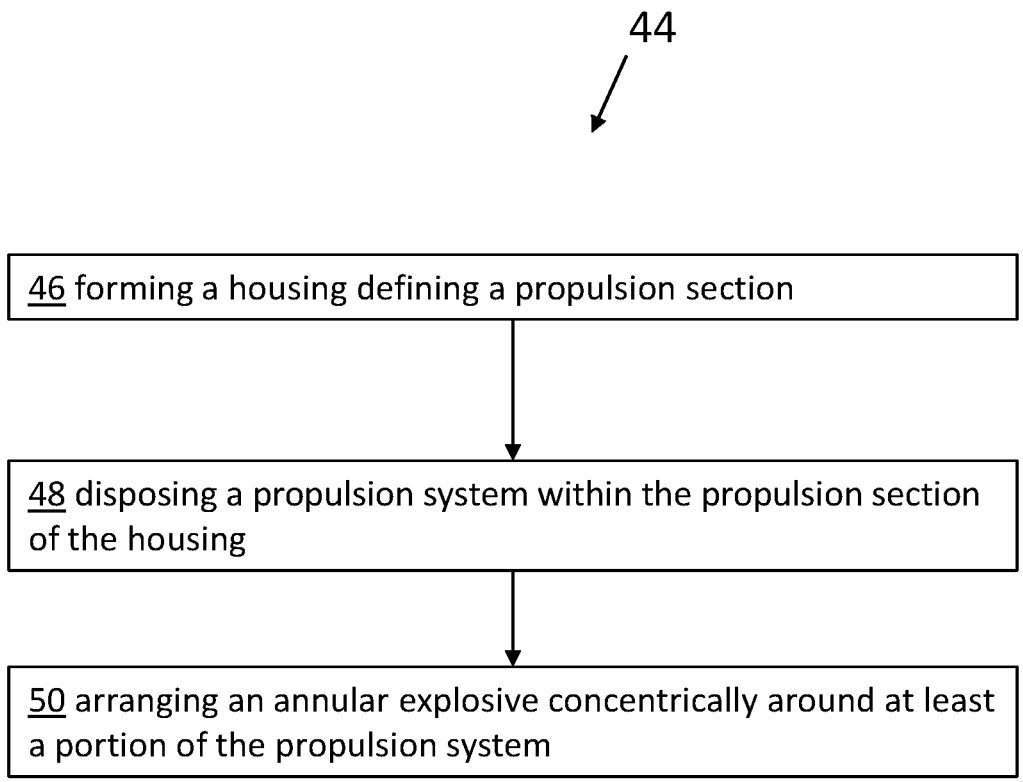
FIG. 4 is a flowchart of a method of assembling an artillery round according to an aspect of the invention.

With reference to FIG. 4, a method 44 is depicted of assembling an integrated propulsion and warhead system (such as the integrated propulsion and warhead system 22 of FIGS. 1-3), for an artillery round (such as the artillery round 10 of FIGS. 1-3). The method 44 includes the step 46 of forming a housing defining a guidance section and a propulsion section (such as the guidance section 18 and the propulsion section 20 in FIGS. 1-3).

The method 44 then includes the step 48 of disposing a propulsion system (such as the propulsion system 24 of FIGS. 1-3) within the propulsion section of the housing. A step 50 of arranging an annular explosive (such as the annular explosive 26 of FIGS. 1-3) concentrically around at least a portion of the propulsion system is then provided. The step 48 of disposing and the step 50 of arranging may be performed in any order. For example, the step of arranging 50, when performed before the step 48 of disposing, may include arranging the annular explosive within the propulsion section of the housing, and the step 48 of disposing may then include disposing the propulsion system within the annular explosive in the propulsion section such that the propulsion system is arranged concentrically within the annular explosive.

Figure 5:
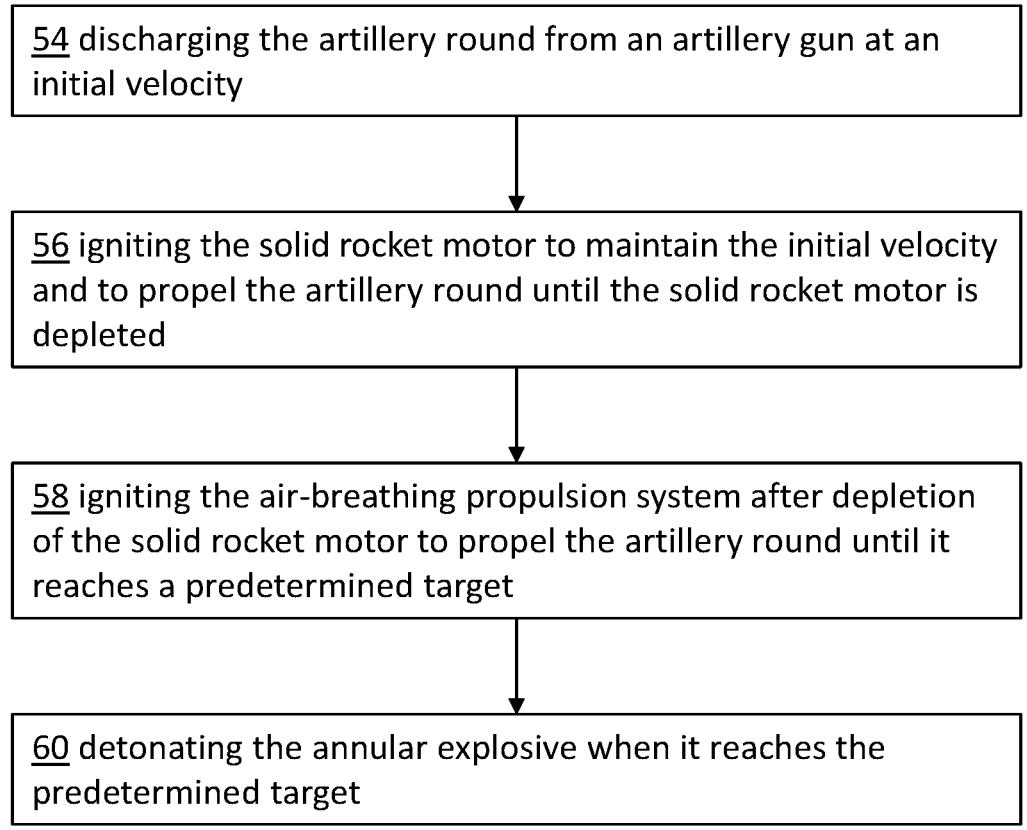
FIG. 5 is a flowchart of a method of detonating an artillery round according to an aspect of the invention.

With reference to FIG. 5, a method 52 of detonating an artillery round (such as the artillery round 10 of FIGS. 1-3) is depicted. The method 52 includes the step 54 of discharging the artillery round from an artillery gun at an initial velocity. The artillery round includes an integrated propulsion and warhead system (such as the integrated propulsion and warhead system 22 of FIGS. 1-3). Specifically, the integrated propulsion and warhead system includes a propulsion system having a solid rocket motor and an annular air-breathing jet engine concentrically arranged around at least a portion of the solid rocket motor (such as the configuration of the propulsion system 24 of FIGS. 2-3). The integrated propulsion and warhead system also includes an annular explosive concentrically arranged around at least a portion of the propulsion system (such as the annular explosive 26 of FIGS. 1-3).

The method 52 further includes the step 56 of igniting the solid rocket motor to maintain or increase the initial velocity of the artillery round after discharge from the gun and to propel the artillery round until the solid rocket motor is depleted. When initially discharged from the gun, the artillery round must first travel through thick atmosphere. The solid rocket motor, therefore, is ignited to propel the artillery round through this thick atmosphere. Once the solid rocket motor is depleted, ambient air reaches the air-breathing jet engine to ignite and burn the air-breathing jet engine fuel. The method 52 further includes the step 58 of igniting the air-breathing jet engine after depletion of the solid rocket motor to further propel the artillery round until it reaches a predetermined target. Typically, by the time the air-breathing jet engine is ignited, the artillery round will be in thinner atmosphere, compared to when it was first discharged from the gun. Accordingly, the air-breathing jet engine is ignited to further propel the artillery round through the thinner atmosphere, until it reaches the predetermined target. The method 52 then further includes the step 60 of detonating the annular explosive when it reaches the predetermined target.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An integrated propulsion and warhead system for an artillery round, the integrated propulsion and warhead system comprising: a propulsion system; and an annular explosive concentrically arranged around at least a portion of the propulsion system; wherein the propulsion system includes an air-breathing jet engine.

2. The integrated propulsion and warhead system according to claim 1, wherein the propulsion system includes: a solid rocket motor; and an annular, air-breathing jet engine concentrically arranged around at least a portion of the solid rocket motor.

3. The integrated propulsion and warhead system according to claim 1, wherein the air-breathing jet engine includes a ramjet.

4. The integrated propulsion and warhead system according to claim 1, wherein the air-breathing jet engine includes a scramjet.

5. The integrated propulsion and warhead system according to claim 1, wherein the annular explosive includes a high-explosive material.

6. The integrated propulsion and warhead system according to claim 1, further comprising an annular insulating member concentrically arranged between the propulsion system and the annular explosive.

7. The integrated propulsion and warhead system according to claim 6, further comprising an annular support member concentrically arranged between the propulsion system and the annular explosive.

8. The integrated propulsion and warhead system according to claim 7, wherein the annular support member is concentrically arranged around the annular insulating member.

9. The integrated propulsion and warhead system according to claim 1, further comprising a housing concentrically arranged around the annular explosive.

10. An artillery round comprising: a housing defining a guidance section and a propulsion section, the propulsion section including an integrated propulsion and warhead system, wherein the integrated propulsion and warhead system includes: a propulsion system; and an annular explosive concentrically arranged around at least a portion of the propulsion system; wherein the propulsion system includes an air-breathing jet engine.

11. The artillery round according to claim 10, further comprising a nozzle, wherein the guidance section is arranged on a fore end of the propulsion section, and the nozzle is arranged on an aft end of the propulsion section.

12. The artillery round according to claim 10, wherein the housing further defines at least one air inlet for guiding ambient air into the propulsion section.

13. The artillery round according to claim 10, further comprising a fuel isolator disposed between the propulsion section and the guidance section.

14. The artillery round according to claim 10, further comprising an annular insulating member concentrically arranged between the propulsion system and the annular explosive.

15. The artillery round according to claim 14, further comprising an annular support member concentrically arranged around the annular insulating member.

16. The artillery round according to claim 10, further comprising a safe and arm device operatively coupled to the annular explosive in the propulsion section and configured to control detonation of the annular explosive.

17. The artillery round according to claim 10, wherein the propulsion system includes a solid rocket motor and an annular air-breathing jet engine concentrically arranged around the solid rocket motor.

18. A method of assembling an integrated propulsion and warhead system for an artillery round, the method comprising:
    forming a housing defining a propulsion section;
    disposing a propulsion system within the propulsion section, wherein the propulsion system includes an air-breathing jet engine; and
    arranging an annular explosive concentrically around at least a portion of the propulsion system within the propulsion section.

\* \* \* \* \*